United States Patent [19]

Sze et al.

[11] 4,259,645

[45] Mar. 31, 1981

[54] HIGH ENERGY XEBR ELECTRIC DISCHARGE LASER

[75] Inventors: Robert C. Sze, Santa Fe; Peter B. Scott, Los Alamos, both of N. Mex.

[73] Assignee: The United States of America as represented by the United States Department of Energy, Washington, D.C.

[21] Appl. No.: 28,778

[22] Filed: Apr. 10, 1979

[51] Int. Cl.³ .............................................. H01S 3/22
[52] U.S. Cl. ............................................. 331/94.5 G
[58] Field of Search .................................. 331/94.5 G

[56] References Cited

U.S. PATENT DOCUMENTS 3,991,385   11/1976   Fein et al. ...................... 331/94.5 D

OTHER PUBLICATIONS

"High Energy Lasing of XeBr in an Electric Discharge" by Sze et al; *Appl. Phys. Lett.* 32(8), Apr. 1978.
"¼-J Discharge Pumped KrF Laser" by Sze et al.; *Rev. Sci. Instrum.* 49(6), Jun. 1978.
"Intense Lasing in Discharge Excited Noble-Gas Monochlorides" by Sze et al; *Appl. Phys. Lett.* 33(5), Sep. 1978.

"KrCl Laser Oscillation at 222 nm" by Murray et al; Eden et al; *Appl. Phys. Lett.* 29(6), Sep. 1978.
"Observation of Stimulated Emission in KrCl" by Gary Eden et al., *Appl. Phys. Lett.* 29(6), Sep. 1978.
"XeBr Exciplex Laser" by Searless; *Appl. Phys. Lett.* 28(10), May 1976.
"Stimulated Emission at 281.8 nm from XeBr" by Searless et al; *Appl. Phys. Lett.* 27(4), Aug. 1975.
LA-UR-78-2748; "Improved Lasing Performance of XeCl Using Ar and Ne Diluents"; *Appl. Phys. Lett.* submitted Oct. 1978 by Robert E. Sze.
LA-UR-79-193; "Theoretical Studies of Molecular Electronic Transition Lasers"; *Annual Rev. of Phys. Chem.* submitted by Hay et al.

*Primary Examiner*—William L. Sikes
*Assistant Examiner*—Léon Scott, Jr.
*Attorney, Agent, or Firm*—William W. Cochran, II; Paul D. Gaetjens; James E. Denny

[57] ABSTRACT

A high energy XeBr laser for producing coherent radiation at 282 nm. The XeBr laser utilizes an electric discharge as the excitation source to minimize formation of molecular ions thereby minimizing absorption of laser radiation by the active medium. Additionally, HBr is used as the halogen donor which undergoes harpooning reactions with $Xe_M^*$ to form $XeBr^*$.

11 Claims, 6 Drawing Figures

HIGH ENERGY XEBR ELECTRIC DISCHARGE LASER

BACKGROUND OF THE INVENTION

The present invention pertains generally to lasers and more particularly to excimer lasers.

Lasing of the XeBr e-beam excited exciplex has been known to the prior art as disclosed by S. K. Searles and G. A. Hart, Appl. Phys. Letts. 27 243 (1975). Although XeBr lasing as disclosed by Searles and Hart supra was the earliest noble gas monohalide excimer lased, XeBr has never shown any promise of becoming a useful coherent source. In fact, prior art emissions by XeBr e-beam excited lasers have been so close to threshold that measurements of output energy could not be made.

Although now known to the prior art, the use of e-beam excited discharges in prior art XeBr lasers, initially forms a large number of atomic and molecular ions such as $Xe_2^+$, $Ar_2^+$, and $Ne_2^+$ which function to absorb the 282 nm laser radiation, thereby impending generation of high energy lasing output. Formation of these atomic and molecular ions is unavoidable in prior art e-beam excited discharges since large amounts of energy are used for the formation of XeBr by dissociating $Br_2$ and ionizing Xe to from free $Xe^+$ and $Br^-$ which interact to form XeBr. However, many molecular ions are also initially formed in the active medium which have an absorption spectrum which overlaps 282 nm, resulting in low output lasing energies.

SUMMARY OF THE INVENTION

The present invention overcomes the disadvantages and limitations of the prior art by providing a high energy XeBr electric discharge laser using HBr as a halogen donor. According to the present invention, the electric discharge produces xenon metastables which react with the HBr halogen donor to form the XeBr exciplex according to the following harpooning reaction: $Xe_M^* + HBr \rightarrow XeBr^* + H$. In this manner, formation of molecular ions is minimal so that output lasing energy is greatly increased.

It is therefore an object of the present invention to provide a high energy XeBr electric discharge laser.

It is also an object of the present invention to provide a high energy XeBr electric discharge laser which utilizes HBr as a halogen donor.

Another object of the present invention is to provide a high energy XeBr electric discharge laser which forms a minimal number of molecular ions.

Another object of the present invention is to provide a high energy XeBr electric discharge laser which generates XeBr from harpooning reactions between $Xe_M^*$ and HBr.

Other objects and further scope of applicability of the present invention will become apparent from the detailed description given hereinafter. The detailed description, indicating the preferred embodiment of the invention, is given only by way of illustration since various changes and modifications within the spirit and scope of the invention will become apparent to those skilled in the art from the detailed description. The foregoing Abstract of the Disclosure is for the purpose of providing a nonlegal brief statement to serve as a searching and scanning tool for scientists, engineers and researchers, and is not intended to limit the scope of the invention as disclosed herein, nor is it intended to be used in interpreting or in any way limiting the scope or fair meaning of the appended claims.

DETAILED DESCRIPTION OF THE PREFERRED EMBODIMENT OF THE INVENTION

Figure 1:
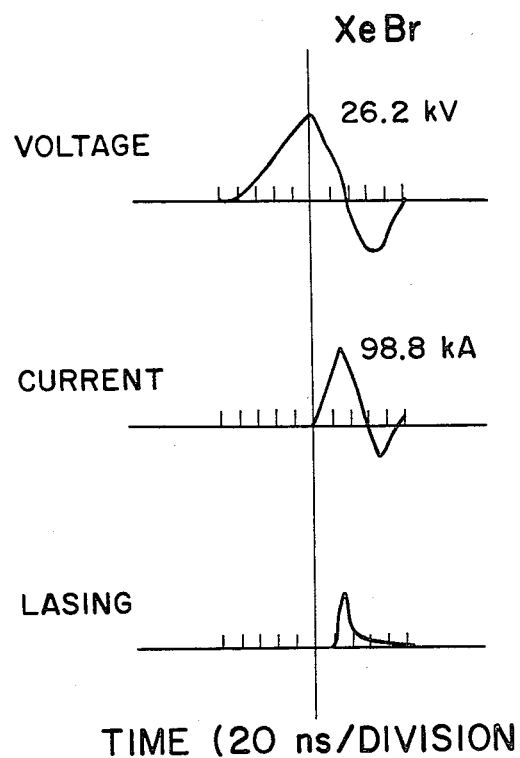
FIG. 1 is a graph of the voltage, current and lasing magnitudes of the device of the present invention plotted versus time.

FIG. 1 illustrates the temporal discharge and lasing characteristics, at 48 psi filling pressure and 48 kV charging voltage, of the lasing mixture 0.1% HBr/5% Xe/94.9% He, in a cable-fed discharge device such as disclosed in Rev. Sci. Instrum. 49 772 (1978) and schematically illustrated in FIG. 6.

As with noble gas monochlorides, successful intense lasing of XeBr according to the present invention is based on utilizing the appropriate halogen donor (HBr) and lasing the excimer in an electric discharge where absorption caused by the formation of molecular ions such as $Xe_2^+$, $Ar_2^+$, $Ne_2^+$ and $He_2^+$ is minimized. Fractions of a percent of HBr in the basically helium gas mix do not degrade the performance of the electric discharge. Consequently, a glow discharge is capable of being sustained for a period of somewhat over 35 ns before the occurrence of streamer and arc formations. Furthermore, the sum of the dissociation energy of HBr (3.25 eV) and the photon energy of XeBr (4.4 eV) is well below the energy of xenon metastables. Consequently, $XeBr^*$ can be efficiently formed from the harpooning reaction $Xe_M^* + HBr \rightarrow XeBr^* + H$. In other words, metastable xenon ($Xe_M^*$) produced by the electric discharge device is capable of producing $XeBr^*$ through harpooning collisions, as set forth above, with minimal generation of molecular ions which are produced in prior art e-beam devices and which tend to absorb XeBr laser radiation at 282 nm. Undesirable molecular ions are produced spontaneously in prior art e-beam excited lasers since energy pathways proceed downward through the initial formation of atomic and molecular ions by depositing large amounts of energy in the gaseous medium. In contrast, the present invention utilizes electric discharges in which energy pathways proceed upward with minimal formation of molecular ions.

Figure 6:
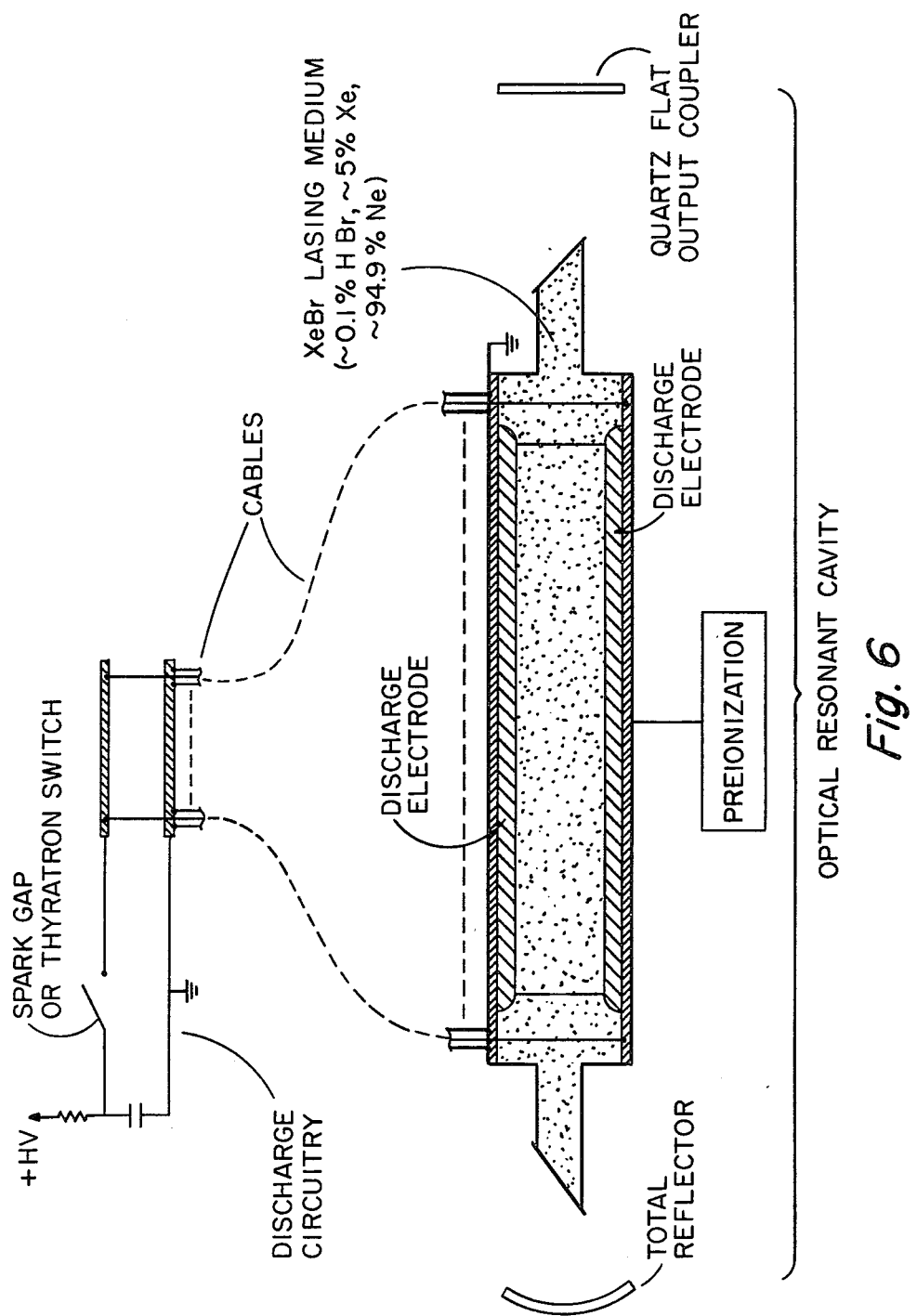
FIG. 6 is a schematic diagram of the electric discharge laser structure utilized in accordance with the present invention.

The particular electric discharge laser structure utilized is a 120 cm active length uv preionized device illustrated in FIG. 6. A single capacitor discharge pulse charges an array of 76, 8-ft-long 40/100 cables distributed evenly along the discharge. This device delivers approximately 260 mJ per pulse at 248 nm in KrF. The voltage, current and lasing temporal characteristics illustrated in FIG. 1 are produced with 0.08-μF Capacitor charged to 48 kV. The voltage and current characteristics illustrated are similar to other noble-gas monohalide lasers utilizing this device. As shown, the lasing time is 20 ns which is short compared to the onset of instabilities in the discharge. The short lasing time is thought to be caused by the formation of transient absorbing species such as $HBr^+$. In any event, lasing occurs from XeBr at 282 nm at approximately 100 nJ per pulse as well as simultaneous oscillation of $Br_2$ at 291 nm.

Figure 2:
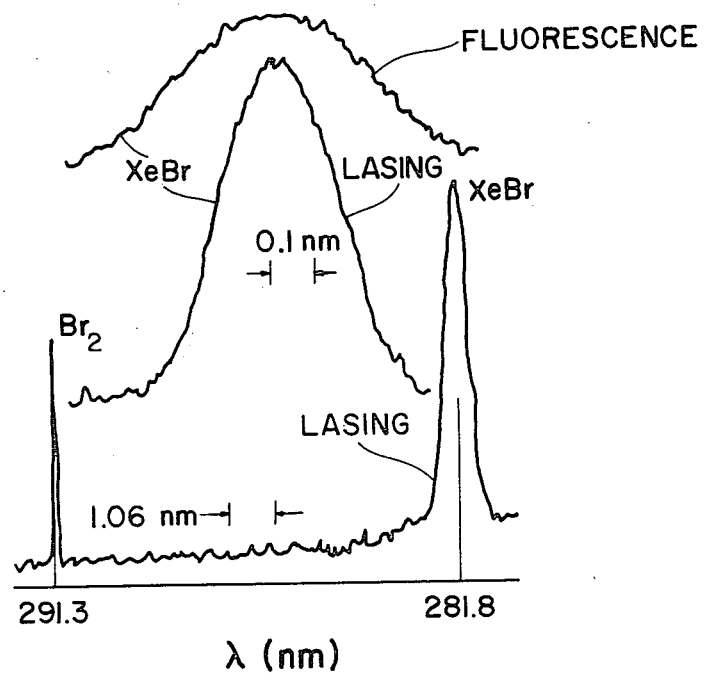
FIG. 2 is a graph of microdensitometer traces of the lasing and fluorescent spectrum of XeBr and the lasing spectrum of $Br_2$.

The lasing and fluorescence spectrum of XeBr are shown in FIG. 2. The spectrum appear somewhat smooth with variations due to molecular band absorptions. The expanded spectrum at the bottom of FIG. 2 illustrates the simultaneous lasing of $Br_2$ at 291.3 nm.

Figure 3:
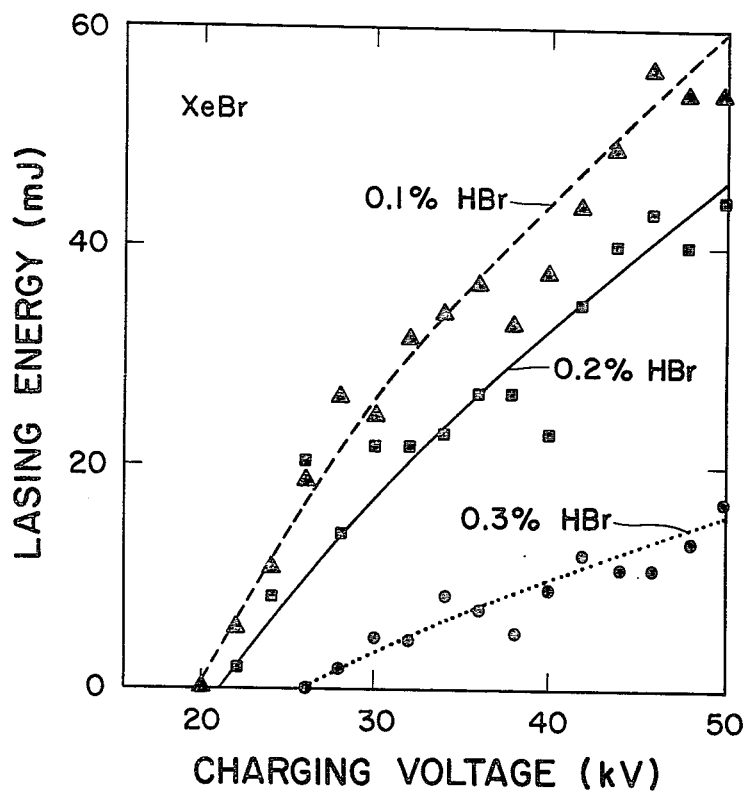
FIG. 3 illustrates lasing energy versus charging voltage for various concentrations HBr with 5% xenon in a helium mixture.

FIG. 3 illustrates lasing energy versus charging voltage for various HBr concentrations with 5% Xe in helium at 45 psia filling pressure. As shown, optimum lasing occurs with 0.1% HBr. Lowering the concentrations to 0.05% HBr results in similar peak enery but lowers the static fill lasing lifetime.

Figure 4:
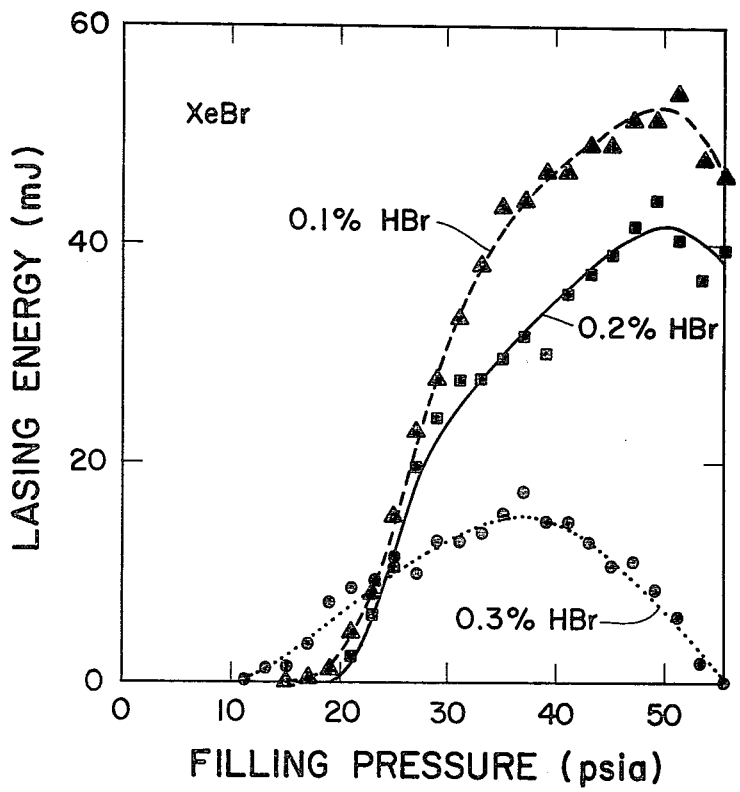
FIG. 4 is a graph of lasing energy versus filling pressure for various concentrations of HBr with 5% xenon in a helium mixture.

FIG. 4 illustrates the lasing energy of the present invention versus filling pressure at 48 kV charging voltage for various HBr concentrations. As shown, the HBr absorbs the lasing energy at higher total filling pressures. This effect is especially prevalent for 0.3% HBr concentrations and higher, as shown in FIG. 4.

Figure 5:
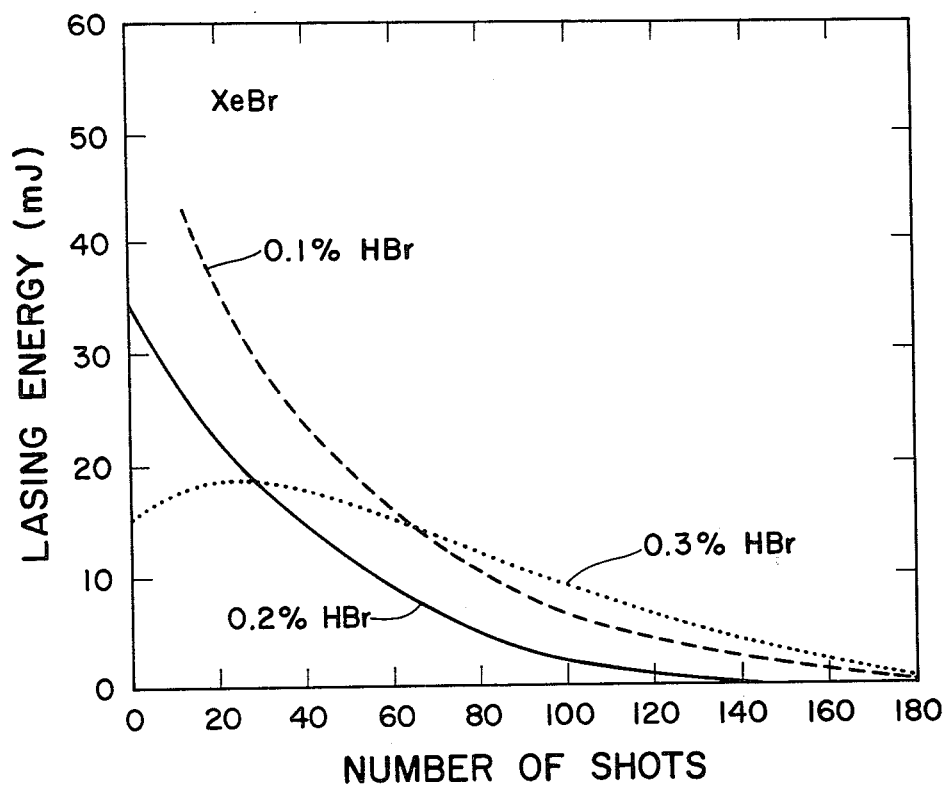
FIG. 5 is a graph of lasing energy versus the number of shots for various concentrations of HBr with 5% xenon in a helium mixture.

FIG. 5 illustrates lasing energy versus the number of shots in a static fill gas for different HBr concentrations. The 0.3% HBr curve shows two effects from the disappearance of HBr. The initial rise in lasing energy is due to increased absorption from HBr while the subsequent decaying tail is associated with the depletion of the donor molecule.

The present invention therefore provides a high energy XeBr electric discharge laser which utilizes HBr as a halogen donor. By utilizing an electric discharger system, rather than an e-beam discharge system, formation of molecular ions is minimized since energy pathways proceed upward through the formation of $Xe_M^*$. XeBr is consequently formed through efficient harpooning reactions. In this manner, high energy outputs are obtained from the XeBr excimer laser of the present invention.

Obviously many modifications and variations of the present invention are possible in light of the above teachings. For example, Ne can be used in place of He to provide even greater output powers. It is therefore to be understood that within the scope of the appended claims the invention may be practiced otherwise than is specifically described.

What is claimed and desired to be secured as Letters Patent of the United States is:

1. In an XeBr excimer laser, the improvement comprising:
   a XeBr lasing medium including HBr as a bromine donor;
   electric discharge means for exciting said lasing medium to minimize the formation of molecular ions such that high output energies are produced by said XeBr excimer laser.

2. The laser of claim 1 wherein said lasing medium comprises:
   ~0.1% HBr
   ~5% Xe
   ~94.9% He 3. The laser of claim 1 wherein said lasing medium comprises:
   ~0.1% HBr
   ~5% Xe
   ~94.9% Ne 4. The laser of claim 1 wherein said electrical discharge means comprises a cable fed discharge system which produces a fast current risetime pulse in said lasing medium.

5. A high energy XrBr noble gas monohalide excimer laser comprising:
   an optical resonant cavity;
   a XeBr lasing medium containing HBr as a halogen donor, said XeBr lasing medium disposed within said optical resonant cavity;
   electrical discharge means for exciting said lasing medium to stimulate laser emission of XeBr and minimize formation of molecular ions in said lasing medium and thereby minimize energy absorption by said lasing medium.

6. The laser of claim 5 wherein said XeBr lasing medium comprises HBr, Xe and He.

7. The laser of claim 5 wherein said XeBr lasing medium comprises HBr, Xe and Ne.

8. The laser of claim 5 wherein said electrical discharge means comprise a cable fed discharge system.

9. A high energy XeBr noble gas mnohalide excimer laser comprising:
   an optical resonant cavity delimited by an energy abstracting means,
   a XeBr lasing medium containing HBr as a halogen donor, said XeBr lasing medium disposed within said optical resonant cavity;
   electrical discharge means for exciting said lasing medium to generate $Xe_M^*$ to form XeBr* according to the reaction: $Xe_M^* + HBr \rightarrow XeBr^* + H$, wherein M denotes metastable Xenon.

10. The laser of claim 9 wherein said XeBr lasing medium comprises HBr, Xe and He.

11. The laser of claim 9 wherein said XeBr lasing medium comprises HBr, Xe and Ne.

* * * * *